(12) United States Patent
Futaki

(10) Patent No.: US 11,729,704 B2
(45) Date of Patent: *Aug. 15, 2023

(54) RADIO TERMINAL, BASE STATION, AND METHOD THEREFOR

(71) Applicant: NEC Corporation, Tokyo (JP)

(72) Inventor: Hisashi Futaki, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/564,627

(22) Filed: Dec. 29, 2021

(65) Prior Publication Data

US 2022/0124604 A1  Apr. 21, 2022

Related U.S. Application Data

(63) Continuation of application No. 16/820,127, filed on Mar. 16, 2020, now Pat. No. 11,265,804, which is a
(Continued)

(30) Foreign Application Priority Data

Jul. 28, 2015  (JP) .................................. 2015-148790

(51) Int. Cl.
*H04W 48/10* (2009.01)
*H04W 88/02* (2009.01)
(Continued)

(52) U.S. Cl.
CPC ........... *H04W 48/10* (2013.01); *H04W 48/16* (2013.01); *H04W 76/18* (2018.02); *H04W 88/02* (2013.01); *H04W 88/10* (2013.01); *H04W 84/045* (2013.01)

(58) Field of Classification Search
CPC ..... H04W 48/10; H04W 48/16; H04W 76/18; H04W 84/045; H04W 88/02; H04W 88/10
See application file for complete search history.

(56) References Cited

U.S. PATENT DOCUMENTS 10,631,233 B2 *  4/2020  Futaki .................. H04W 88/10
11,265,804 B2 *  3/2022  Futaki ..................... H04W 4/06
(Continued)

FOREIGN PATENT DOCUMENTS

WO  WO 2014/160611  10/2014

OTHER PUBLICATIONS

International Search Report dated Sep. 13, 2016, in corresponding PCT International Application.
(Continued)

*Primary Examiner* — Kashif Siddiqui

(57) ABSTRACT

In one implementation, a NAS layer (202) of a radio terminal (1) obtains, from an AS layer (208) of the radio terminal (1), either or both of: information regarding one or more access barring categories (401) broadcasted by a serving network (2); and the number of the one or more access barring categories. If barring information corresponding to a first access barring category (404) to which an application that triggers a session establishment (403) belongs is not broadcasted by an eNB (2), the NAS layer (202) replaces the first access barring category (404) with a particular access barring category among the one or more access barring categories (401) broadcasted by the serving network (202).

11 Claims, 10 Drawing Sheets

Related U.S. Application Data continuation of application No. 15/748,026, filed as application No. PCT/JP2016/002976 on Jun. 21, 2016, now Pat. No. 10,631,233.

(51) Int. Cl.
*H04W 48/16* (2009.01)
*H04W 76/18* (2018.01)
*H04W 88/10* (2009.01)
*H04W 84/04* (2009.01)

(56) References Cited

U.S. PATENT DOCUMENTS

| | | | | |
|---|---|---|---|---|
| 2012/0250626 | A1* | 10/2012 | Iwamura | H04W 76/18 370/328 |
| 2013/0040605 | A1* | 2/2013 | Zhang | H04W 48/10 455/411 |
| 2015/0117213 | A1* | 4/2015 | Pinheiro | H04L 47/2475 370/235 |
| 2017/0006447 | A1* | 1/2017 | Bahta | H04W 4/90 |
| 2017/0006644 | A1* | 1/2017 | Tsuboi | H04W 76/10 |
| 2017/0041854 | A1* | 2/2017 | Kim | H04W 28/0289 |

OTHER PUBLICATIONS $3^{rd}$ Generation Partnership Project: Technical Specification Group Services and Systems Aspects; Service Accessibility, (Release 13), 3GPP TS 22.011, V13.2.0, pp. 1-28, (2015).
3GPP TSG CT WG1 Meeting #90, C1-150143, "Possible options for ACDC stage 3 specification", 4 pages, (2015).
3GPP TSG CT WG1 Meeting #91, C1-151890, "Discussion on Stage 3 Implementation of ACDC Categories", 5 pages, (2015).
3GPP TSG-RAN WG2 Meeting #90, R2-152391, "ACDC Impacts on RAN", 3 pages. (2015).
3GPP TSG-RAN WG2 Meeting #90, R2-152151, "Consideration on RAN2 Impacts to Support ACDC Requirements", pp. 1-8, (2015).
3GPP TSG RAN2 Meeting #91, R2-153455, "ACDC Category Handling", 4 pages, (2015).
Huawei et al., R2-152289, "Discussion on RAN Impacts due to ACDC", 3GPP TSG-RAN WG2 Meeting #90, Fukuoka, Japan, May 25-29, 2015.
Extended European Search Report dated Nov. 30, 2018, issued in counterpart European Patent Application No. 16829999.8.

* cited by examiner

Example of SIB2 including ACDC IE

```
-- ASN1START

SystemInformationBlockType2 ::=    SEQUENCE {
    ac-BarringInfo                 SEQUENCE {
        ac-BarringForEmergency         BOOLEAN,
        ac-BarringForMO-Signalling     AC-BarringConfig       OPTIONAL, -- Need OP
        ac-BarringForMO-Data           AC-BarringConfig       OPTIONAL, -- Need OP
    }                                                         OPTIONAL, -- Need OP
/* skipped */ lateNonCriticalExtension       OCTET STRING (CONTAINING SystemInformationBlockType2-v8h0-IEs)
                                                              OPTIONAL,
    [[ ssac-BarringForMMTEL-Voice-r9   AC-BarringConfig       OPTIONAL, -- Need OP
       ssac-BarringForMMTEL-Video-r9   AC-BarringConfig       OPTIONAL, -- Need OP
    ]],
    [[ ac-BarringForCSFB-r10           AC-BarringConfig       OPTIONAL, -- Need OP
    ]],
    [[
       ac-BarringSkipForMMTELVoice-r12    ENUMERATED {true}   OPTIONAL, -- Need OP
       ac-BarringSkipForMMTELVideo-r12    ENUMERATED {true}   OPTIONAL, -- Need OP
       ac-BarringSkipForSMS-r12           ENUMERATED {true}   OPTIONAL, -- Need OP
       ac-BarringPerPLMN-List-r12         AC-BarringPerPLMN-List-r12 OPTIONAL, -- Need OP
    ]],
    [[
       acdc-BarringList-r13               ACDC-BarringList-r13    OPTIONAL -- Need OP
    ]]
}
/* skipped */

AC-BarringConfig ::=           SEQUENCE {
    ac-BarringFactor               ENUMERATED {
                                       p00, p05, p10, p15, p20, p25, p30, p40,
                                       p50, p60, p70, p75, p80, p85, p90, p95},
    ac-BarringTime                 ENUMERATED {s4, s8, s16, s32, s64, s128, s256, s512},
    ac-BarringForSpecialAC         BIT STRING (SIZE(5))
}
/* skipped */

AC-BarringPerPLMN-List-r12 ::=  SEQUENCE (SIZE (1..maxPLMN-r11)) OF AC-BarringPerPLMN-r12

/* skipped */

AC-BarringPerPLMN-List-r13 ::=  SEQUENCE (SIZE (1..maxPLMN-r11)) OF AC-BarringPerPLMN-r13

AC-BarringPerPLMN-r13 ::=       SEQUENCE {
    plmn-IdentityIndex-r13          INTEGER (1..maxPLMN-r11),
    ac-BarringInfo-r13              SEQUENCE {
        acdc-BarringList-r13            ACDC-BarringList-r13
    }
}

ACDC-BarringList-r13 ::= SEQUENCE (SIZE (1..maxACDC-categories-r13)) OF ACDC-Barring-r13

ACDC-Barring-r13 ::=    SEQUENCE {
    -- depending on maximum number of supported ACDC categories (example of four)
    acdc-Category-r13               ENUMERATED {i, ii, iii, iv},
    acdc-BarringConfig-r13          AC-BarringConfig
}

-- ASN1STOP
```

Fig. 3

RADIO TERMINAL, BASE STATION, AND METHOD THEREFOR

CROSS-REFERENCE TO RELATED APPLICATIONS

The present application is a continuation application of U.S. patent application Ser. No. 16/820,127 filed on Mar. 16, 2020, which is a continuation application of U.S. patent application Ser. No. 15/748,026 filed on Jan. 26, 2018, which issued as U.S. Pat. No. 10,631,233, which is a National Stage Entry of international application PCT/JP2016/002976, filed on Jun. 21, 2016, which claims the benefit of priority from Japanese Patent Application 2015-148790 filed on Jul. 28, 2015, the disclosures of all of which are incorporated in their entirety by reference herein.

TECHNICAL FIELD

The disclosure relates to a radio access network and, in particular, to barring of an access from a radio terminal.

BACKGROUND ART

Non-Patent Literature 1 describes Application specific Congestion control for Data Communication (ACDC). ACDC is an access control mechanism for an operator to allow or prevent new access attempts from particular, operator-identified applications in a User Equipment (UE) in idle mode. Using ACDC, the operator can prevent or mitigate overload of the access network or the core network or both.

ACDC applies only to UEs in idle mode (e.g., RRC_IDLE) and does not apply to UEs in connected mode (e.g., RRC_CONNECTED). The home network (i.e., Home Public Land Mobile Network (HPLMN) or Equivalent HPLMN) is able to configure a UE with at least four ACDC categories. Each ACDC category is associated to particular, operator-identified applications, application group, or services. Provisioning of the ACDC categories in the UE is the responsibility of the home network, and the categorization is outside the scope of 3rd Generation Partnership Project (3GPP). The operator of the home network may configure the ACDC categories, for example, in the Universal Subscriber Identity Module (USIM). The operator of the home network may configure the UE with the ACDC configuration using Open Mobile Alliance Device Management (OMA-DM).

The serving network (i.e., HPLMN, Equivalent HPLMN, or Visited PLMN (VPLMN)) broadcasts control information which indicates barring information per ACDC category and also indicates whether a roaming UE shall be subject to ACDC control. The UE controls whether an access attempt for a certain application is allowed or not, based on the broadcasted barring information and the configuration of ACDC categories (i.e., mapping between the ACDC categories and the applications) in the UE.

When configuring the UE with the ACDC categories, the home network proceeds as follows. Applications whose use is expected to be restricted the least shall be assigned the highest ACDC category. Applications whose use is expected to be restricted more than applications in the highest category shall be assigned the second-to-highest ACDC category. Applications shall be assigned the third-to-highest ACDC category, and so on, in the same manner as the second-to-highest ACDC category. Applications whose use is expected to be restricted the most shall either be assigned the lowest ACDC category, or not be categorized at all.

Applications on a UE that are not assigned to any ACDC category shall be treated by the UE as part of the lowest ACDC category configured in the UE. If the operator requires differentiation with respect to these uncategorized applications, the operator should avoid assigning applications to the lowest ACDC category. When applying ACDC, the serving network broadcasts barring information starting from the highest to the lowest ACDC category.

The home network and the serving network may use different categorization. Specifically, the number of ACDC categories in the UE may not be the same as the number of ACDC categories broadcast by the serving network. This may happen, for example, when the UE is roaming and the number of categories broadcast by the serving network is different from that of the home network. In this situation, the UE proceeds as follows.

If the serving network broadcasts more ACDC categories than the UE's configuration, the UE shall use barring information for the matching ACDC categories, and shall bar uncategorized applications using the barring information for the lowest category broadcast by the serving network, and shall ignore barring information for unmatched categories.

If the serving network broadcasts barring information for fewer ACDC categories than the UE's configuration, the UE shall use barring information for the matching ACDC categories and shall bar other applications (including applications belonging to unmatched ACDC categories) using the barring information for the lowest category broadcast by the serving network.

A matching ACDC category is an ACDC category for which barring information is broadcast by the serving network and that has the same rank as the rank of a configured ACDC category in the UE. Meanwhile, an unmatched ACDC category is either an ACDC category for which barring information is broadcast by the serving network but with no corresponding ACDC category configured in the UE, or an ACDC category configured in the UE but with no corresponding barring information broadcast by the serving network.

Non-Patent Literature 2 has suggested which layer (application layer, Non-Access Stratum (NAS) layer or Radio Resource Control (RRC) layer) should perform the UE's operation required for ACDC. Specifically, Non-Patent Literature 2 has introduced some options in which the application layer, the NAS layer, or the RRC layer performs ACDC check. The ACDC check is a determination of whether to allow an access attempt triggered by an application, based on the ACDC category to which the application belongs determined by the ACDC configuration in the UE and also based on the barring information broadcasted by the serving network.

For example in the option in which the NAS layer performs the ACDC check, upon receiving a session establishment request from upper layers, if the UE is in Evolved Packet System (EPS) connection management IDLE (ECM-IDLE) mode, the NAS layer operates to:
1. Determine the ID (OS App ID) of the application triggering the request;
2. Determine to which ACDC category this OS App ID belongs based on the information provisioned to the UE by the home network operator via OMA DM or the USIM;
3. Obtain the barring information for the given ACDC category from the RRC layer;
4. Perform the ACDC check; and
5. Proceed with the Service Request procedure if the ACDC check passes.

Non-Patent Literature 2 has suggested two options in which the RRC layer performs the ACDC check. In one of the two options, upon receiving an access attempt request, if the UE is in RRC_IDLE state, the RRC layer operates to:
1. Determine the ID (OS App ID) of the application triggering the access attempt request;
2. Determine to which ACDC category this OS App ID belongs based on the information provisioned to the UE by the home network operator via OMA DM or the USIM;
3. Perform the ACDC check based on the barring information for the given ACDC category obtained from System Information Block (SIB) information; and
4. Proceed with the access attempt if the ACDC check passes.

Alternatively, in the other option in which the RRC layer performs the ACDC check, upon receiving a session establishment request, if the UE is in EMM-IDLE mode, the NAS layer operates to:
1. Determine the ID (OS App ID) of the application triggering the session establishment request;
2. determine to which ACDC category this OS App Id belongs based on the information provisioned to the UE by the home operator via Open Mobile Alliance Device Management (OMA-DM) or the USIM; and
3. Pass the corresponding ACDC category along with the Service Request and the call type to the RRC layer.

Next, upon receiving the Service Request with the call type and the ACDC category from the NAS layer, the RRC layer operates to:
1. Perform the ACDC check based on the barring information for the received ACDC category obtained from System Information Block (SIB) information; and
2. Proceed with the access attempt if the ACDC check passes.

CITATION LIST

Non Patent Literature

Non Patent Literature 1: 3GPP TS 22.011 V13.2.0 (2015-06), "3rd Generation Partnership Project; Technical Specification Group Services and System Aspects; Service accessibility (Release 13)", June 2015
Non Patent Literature 2: 3GPP C1-150143, Qualcomm Incorporated, "Possible options for ACDC stage 3 specification", February 2015

SUMMARY OF INVENTION

Technical Problem

As described above, Non-Patent Literature 2 provides several options for interactions among the application layer, the NAS layer, and the RRC layer when the UE performs ACDC. However, it is not clear how the UE operates when the number of ACDC categories configured in the UE is not the same as the number of ACDC categories broadcasted by the serving network.

Specifically, as described above, Non-Patent Literature 1 describes that, if the serving network broadcasts fewer ACDC categories than the UE's configuration, the UE uses the barring information for the matching ACDC categories and bars other applications using the barring information for the lowest (ACDC) category broadcasted by the serving network. Therefore, when an application that triggers an access attempt belongs to an "unmatched ACDC category," the UE needs to regard the application as belonging to a particular ACDC category (e.g., the lowest ACDC category) broadcasted by the serving network in order to perform the ACDC check on the application. However, the interaction among the application layer, the NAS layer, and the RRC layer for implementing this operation by the UE is not clarified. Here, an "unmatched ACDC category" means an ACDC category configured in the UE but with no corresponding barring information broadcasted by the serving network.

One of the objects to be attained by embodiments disclosed in the present specification is to provide an apparatus, a method, and a program that contribute to providing an operation within a radio terminal for handling a case in which a serving network does not broadcast barring information corresponding to an access barring category (e.g., ACDC category) to which an application that triggers an access attempt belongs. It is to be noted that this object is merely one of the objects to be attained by the embodiments disclosed herein. Other objects or problems and novel features will become apparent from the descriptions in the present specification or from the appended drawings.

Solution to Problem

In a first aspect, a radio terminal includes at least one radio transceiver and at least one processor. The at least one processor is coupled to the radio transceiver and is configured to operate as a non-access stratum (NAS) layer providing mobility management and session management and as an access stratum (AS) layer providing radio resource control. The NAS layer is adapted to obtain, from the AS layer, either or both of: information regarding one or more access barring categories broadcasted by a serving network; and the number of the one or more access barring categories. The NAS layer is further adapted to, if barring information corresponding to a first access barring category to which an application that triggers a session establishment belongs is not broadcasted by the serving network, replace the first access barring category with a particular access barring category among the one or more access barring categories broadcasted by the serving network. Furthermore, the NAS layer is adapted to pass the particular access barring category along with a NAS message for the session establishment to the AS layer. The AS layer is adapted to control whether to allow an access attempt triggered by the NAS layer based on barring information broadcasted by the serving network and corresponding to the particular access barring category.

In a second aspect, a method in a radio terminal includes:
(a) sending, from an access stratum (AS) layer to a non-access stratum (NAS) layer, either or both of: information regarding one or more access barring categories broadcasted by a serving network; and the number of the one or more access barring categories;
(b) when barring information corresponding to a first access barring category to which an application that triggers a session establishment belongs is not broadcasted by the serving network, replacing, by the NAS layer, the first access barring category with a particular access barring category among the one or more access barring categories broadcasted by the serving network;
(c) passing, from the NAS layer to the AS layer, the particular access barring category along with a NAS message for the session establishment; and
(d) controlling, by the AS layer, whether to allow an access attempt triggered by the NAS layer based on barring information broadcasted by the serving network and corresponding to the particular access barring category.

In a third aspect, a radio terminal includes at least one radio transceiver and at least one processor. The at least one processor is coupled to the radio transceiver and is configured to operate as a non-access stratum (NAS) layer providing mobility management and session management and as an access stratum (AS) layer providing radio resource control. The NAS layer is adapted to pass a first access barring category to which an application that triggers a session establishment belongs, along with a NAS message for the session establishment to the AS layer. The AS layer is adapted to, if barring information corresponding to the first access barring category received from the NAS layer is not broadcasted by a serving network, select, from one or more access barring categories broadcasted by the serving network, a particular access barring category instead of the first access barring category. The AS layer is further adapted to control whether to allow an access attempt triggered by the NAS layer based on barring information broadcasted by the serving network and corresponding to the particular access barring category.

In a fourth aspect, a method in a radio terminal includes: (a) passing, from a non-access stratum (NAS) layer to an access stratum (AS) layer, a first access barring category to which an application that triggers a session establishment belongs, along with a NAS message for the session establishment;
(b) if barring information corresponding to the first access barring category received from the NAS layer is not broadcasted by a serving network, selecting by the AS layer, from one or more access barring categories broadcasted by the serving network, a particular access barring category instead of the first access barring category; and
(c) controlling, by the AS layer, whether to allow an access attempt triggered by the NAS layer based on barring information broadcasted by the serving network and corresponding to the particular access barring category.

In a fifth aspect, a base station includes: a radio transceiver configured to communicate with a radio terminal located within a cell; and at least one processor coupled to the radio transceiver. The at least one processor is configured to broadcast, in the cell, one or more access barring categories, barring information for each of the one or more access barring categories, and a mapping rule. The selecting includes selecting, by the AS layer, the particular access barring category instead of the first access barring category, when barring information corresponding to the first access barring category specified by the call type is not broadcasted by the serving network, or when the AS layer cannot recognize the call type.

In a sixth aspect, a method in a base station includes broadcasting, in a cell, one or more access barring categories, barring information for each of the one or more access barring categories, and a mapping rule. The mapping rule defines mapping between the one or more access barring categories broadcasted by the base station and one or more access barring categories provisioned in a radio terminal.

In a seventh aspect, a program includes instructions (software codes) that, when loaded into a computer, causes the computer to perform the method according to the above-described second, fourth, or sixth aspect Advantageous Effects of Invention According to the above aspects, there can be provided an apparatus, a method, and a program that contribute to providing an operation within a radio terminal for handling a case in which a serving network does not broadcast barring information corresponding to an access barring category (e.g., ACDC category) to which an application that triggers an access attempt belongs.

BRIEF DESCRIPTION OF THE DRAWINGS

FIG. 3 is a diagram illustrating a specific example of ACDC control information;

DESCRIPTION OF EMBODIMENTS

Hereinafter, specific embodiments will be described in detail with reference to the drawings. The same or corresponding elements are denoted by the same reference signs throughout the drawings, and repeated descriptions will be omitted as necessary for the sake of clarity.

The following descriptions on the embodiments mainly focus on an Evolved Packet System (EPS) accommodating LTE and SAE (System Architecture Evolution). However, these embodiments are not limited to the EPS and may be applied to other mobile communication networks or systems such as 3GPP UMTS, 3GPP2 CDMA 2000 system (1×RTT, High Rate Packet Data (HRPD), global system for mobile communications (GSM (registered trademark))/General packet radio service (GPRS), and WiMAX system.

First Embodiment

Figure 1:
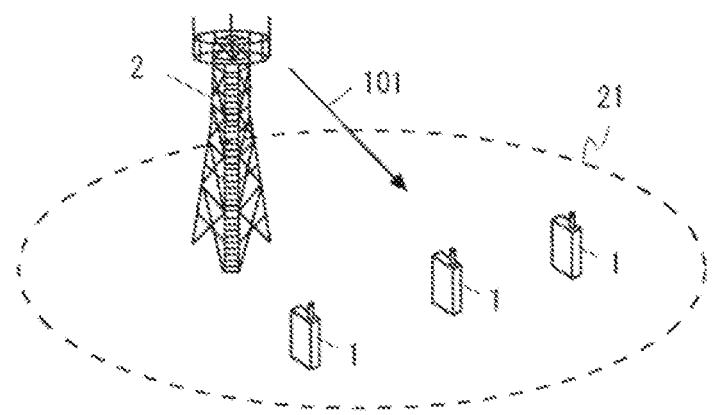
FIG. 1 is a diagram illustrating a configuration example of a radio communication network according to some embodiments.

FIG. 1 illustrates a configuration example of a radio communication network according to several embodiments including the present embodiment. In the example illustrated in FIG. 1, the radio communication network includes one or more radio terminals (UEs) 1 and a base station (eNB) 2. Each UE 1 includes at least one radio transceiver and is configured to perform cellular communication with the eNB 2. The eNB 2 manages a cell 21 and is configured to perform cellular communication with respective UEs 1 using cellular communication technology (e.g., Evolved Universal Terrestrial Radio Access (E-UTRA) technology).

The eNB 2 illustrated in FIG. 1 may be a Baseband Unit (BBU) used in Centralized Radio Access Network (C-RAN)

architecture. In other words, the eNB 2 illustrated in FIG. 1 may be a RAN node connected to one or more Remote Radio Heads (RRHs). In some implementations, the eNB 2 serving as a BBU is in charge of control-plane processing and digital baseband signal processing for the user plane. Meanwhile, an RRH is in charge of analog Radio Frequency (RF) signal processing (e.g., frequency conversion and signal amplification). The C-RAN is also referred to as a Cloud RAN. The BBU is also referred to as a Radio Equipment Controller (REC) or a Data Unit (DU). The RRH is also referred to as Radio Equipment (RE), a Radio Unit (RU), or a Remote Radio Unit (RRU).

The eNB 2 transmits access control information (e.g., barring information) corresponding to predetermined access barring categories (e.g., ACDC categories). For example, the eNB 2 broadcasts broadcast information (i.e., SIB information) 101 containing ACDC control information regarding access control by ACDC. The ACDC control information broadcasted by the eNB 2 includes barring information per ACDC category. Each UE 1 controls whether to allow an access attempt to the eNB 2 triggered by an application, in accordance with the barring information broadcasted by the eNB 2.

Figure 2:
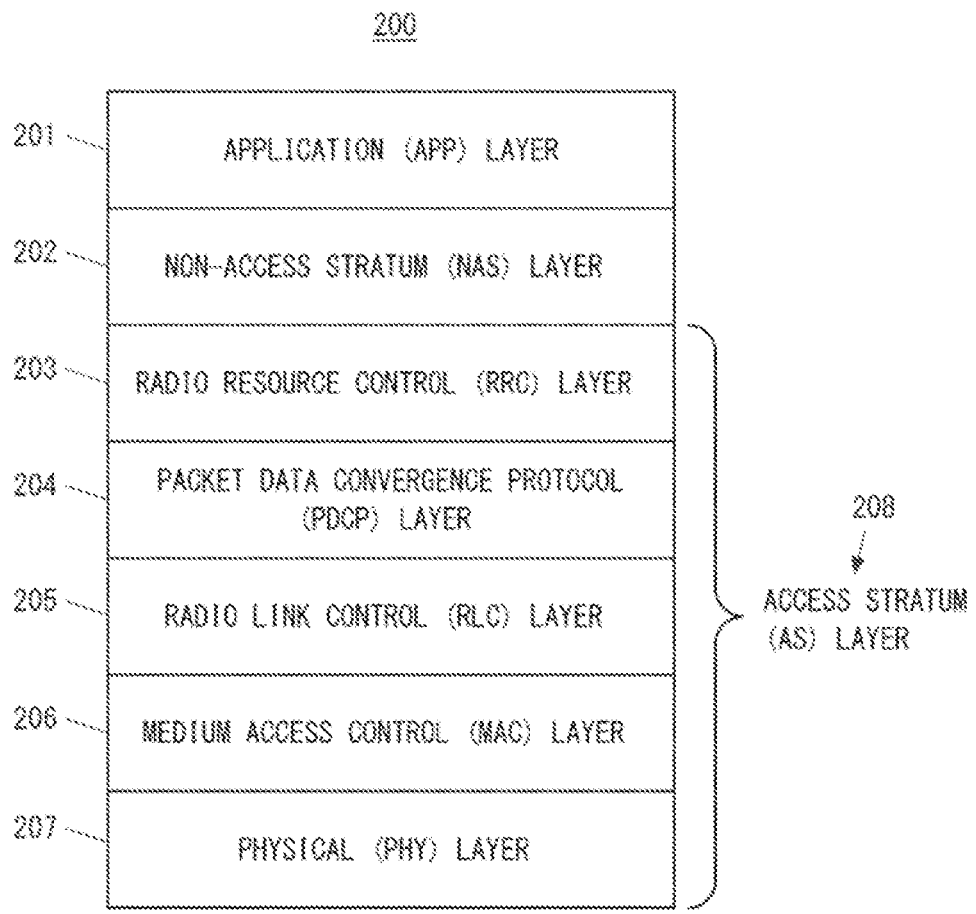
FIG. 2 is a diagram illustrating an example of a protocol stack of a control plane of a radio terminal according to some embodiments.

FIG. 2 illustrates an example of a protocol stack in the control plane of the UE 1. A control plane protocol stack 200 of the UE 1 includes an application (APP) layer 201, a NAS layer 202, and an Access Stratum (AS) 208 layer. The AS layer 208 includes an RRC layer 203, a Packet Data Convergence Protocol (PDCP) layer 204, a Radio Link Control (RLC) layer 205, a Medium Access Control (MAC) layer 206, and a physical (PHY) layer 207.

The NAS layer 202 uses data communication on a radio interface and management of the radio interface provided by the AS layer 208, communicates with a core network (i.e., Evolved Packet Core (EPC)) via the eNB 2, and provides mobility management (i.e., EPS Mobility Management (EMM)) and session management (i.e., EPS Session Management (ESM)) for the UE 1. The mobility management (EMM) includes managing of two NAS states of the UE 1 related to the connection establishment with the EPC, i.e., an EMM state (i.e., EMM-DEREGISTERED or EMM-REGISTERED) and an ECM state (i.e., ECM-IDLE or ECM-CONNECTED). The EMM state indicates whether the UE 1 is registered in a Mobility Management Entity (MME) within the EPC. The ECM state describes the state of the NAS signaling connectivity between the UE 1 and the EPC. ECM-IDLE and ECM-CONNECTED may also be referred to as EMM-IDLE and EMM-CONNECTED, respectively.

The mobility management (EMM) protocol implemented in the NAS layer 202 includes an attach procedure, a detach procedure, and a Tracking Area Update (TAU) procedure. The mobility management (EMM) protocol further includes procedures for the EMM connection management, i.e., a Service Request procedure and a Transport of NAS messages procedure.

The session management (ESM) includes EPS bearer context management including activation, deactivation, and modification of a user plane bearer context (i.e., EPS bearer context). The session management (ESM) further includes requesting by the UE 1 of resources (e.g., IP connectivity to a Packet Data Network (PDN) or dedicated bearer resources).

The NAS layer 202 communicates with the RRC layer 203 to utilize the services (i.e., data communication on the radio interface and management of the radio interface) provided by the AS layer 208. The RRC layer 203, which is a lower layer of the NAS layer 202, provides the radio resource control (RRC) and manages the RRC state (i.e., RRC_IDLE or RRC_CONNECTED) of the UE 1. The RRC state indicates whether the radio connection (RRC connection) between the UE 1 and the eNB 2 has been established.

For example, in response to receiving a session establishment request from an upper layer (i.e., the application layer 201), if the UE is in ECM-IDLE mode, the NAS layer 202 initiates a Service Request procedure and attempts to send a Service Request message to an MME. The Service Request message from the NAS layer 202 triggers the AS layer 208 to establish an RRC connection with the eNB 2, and the RRC layer 203 initiates an RRC connection establishment procedure. In the present embodiment, the UE 1 performs ACDC when the UE 1 makes an access attempt to the eNB 2 triggered by a Service Request procedure. Here, the session may be for example, but not limited to, one of S1-MME, S1-U (S1 bearer), network bearer (E-RAB, EPS Bearer, S5/S8 bearer), Radio Bearer, PDN connection, and IP Connectivity Access Network (IP-CAN) session, or any combination thereof.

FIG. 3 illustrates an example of the ACDC control information (ACDC Information Element (IE)) in a case of this control information being transmitted in System Information Blok Type 2 (SIB2). As illustrated in FIG. 3, the ACDC control information includes: category information (acdc-Category) with respect to ACDC; and Access Class Barring (ACB) configuration information (acdc-BarringConfig=AC-BarringConfig) corresponding to each ACDC category. In addition, the eNB 2 may transmit information indicating whether to apply ACDC (or indicating that ACDC is applied) to each (or a part) of the PLMNs broadcasted in the cell. Furthermore, the eNB 2 may configure these information elements (acdc-Category and acdc-BarringConfig) individually for each (or a part) of the PLMN Identities broadcasted in the cell and transmit the configured information elements.

The following describes the operations of the NAS layer 202 and the AS layer 208 (in particular, the RRC layer 203) for ACDC. In particular, the operations of the NAS layer 202 and the RRC layer 203 of the UE 1 performed when the serving network (eNB 2) broadcasts ACDC categories fewer than the number of ACDC categories contained in the ACDC configuration provisioned in the UE 1 will be described.

Figure 4:
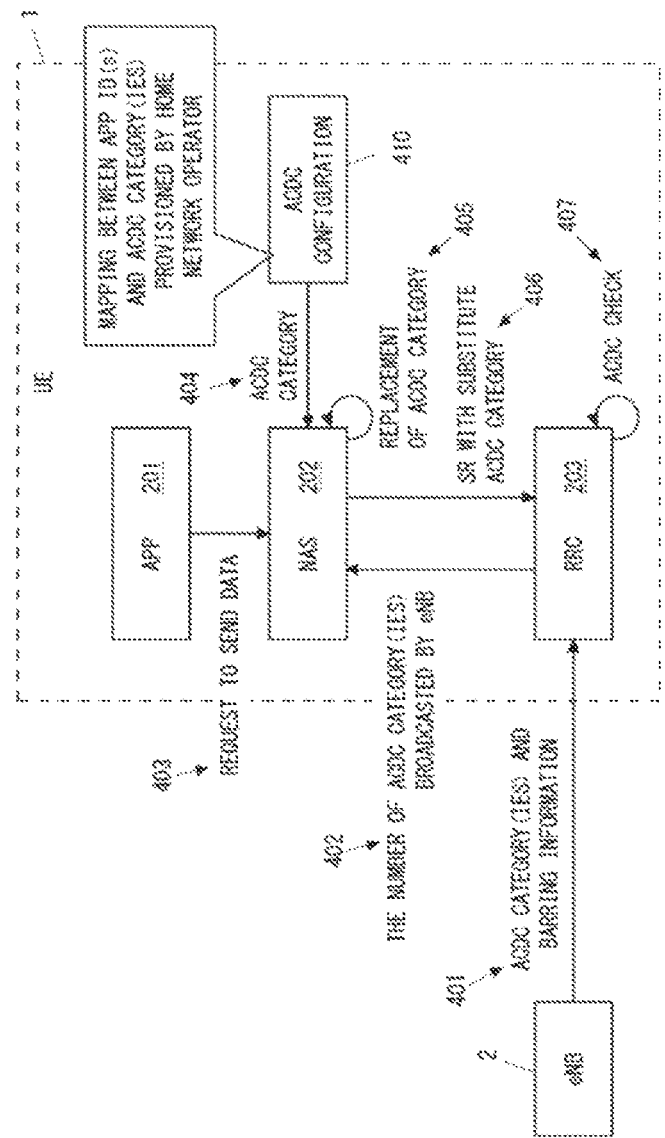
FIG. 4 is a diagram for describing an ACDC operation performed by a radio terminal according to a first embodiment.

FIG. 4 illustrates an example of the ACDC operation in the UE 1. The eNB 2 transmits the ACDC control information (ACDC IE) to the UE 1 (401). The ACDC control information includes one or more ACDC categories and barring information per ACDC category. The eNB 2 may incorporate the ACDC control information into broadcast information (e.g., SIB information) broadcasted in the cell 21 to enable at least UEs 1 in idle mode (i.e., in ECM-IDLE and RRC_IDLE) to receive the ACDC control information. Here, the eNB 2 may transmit the ACDC control information configured commonly for all the UEs 1 (in idle mode) having the ACDC function within the cell or may transmit the ACDC control information configured per PLMN Identity broadcasted within the cell. When the UE 1 detects that the ACDC control information is being transmitted per PLMN Identity, the UE 1 checks whether a PLMN Identity corresponding to the PLMN that the upper layer (i.e., NAS) of the UE 1 has selected is subject to ACDC. When the PLMN Identity is subject to ACDC, the UE 1 performs access control of ACDC based on the ACDC control information configured for this PLMN Identity.

The NAS layer 202 of the UE 1 obtains (receives), from the RRC layer 203, either or both of: one or more ACDC categories broadcasted by the serving network (eNB 2); and the number of the broadcasted ACDC category(ies) (402). In other words, the RRC layer 203 of the UE 1 notifies the NAS layer 202 of either or both of: information regarding the one or more ACDC categories broadcasted by the serving network (eNB 2); and the number of the broadcasted ACDC category(ies).

In some implementations, if the number of the one or more ACDC categories broadcasted by the serving network (eNB 2) is smaller than the number of one or more ACDC categories contained in the ACDC configuration 410 provisioned in the UE 1, the RRC layer 203 may provide the NAS layer 202 with either or both of: the information regarding the one or more ACDC categories broadcasted by the serving network (eNB 2); and the number of the broadcasted ACDC category(ies). In this way, the RRC layer 203 is able to provide the NAS layer 202 with the latest number of ACDC categories in the serving network.

Additionally or alternatively, in response to receiving the updated (i.e., the latest) broadcast information (SIB information) broadcasted by the serving network (eNB 2), if the received broadcast information contains the ACDC control information, the RRC layer 203 may provide the NAS layer 202 with either or both of: the information regarding the one or more ACDC categories broadcasted by the serving network; and the number of the broadcasted ACDC category(ies). In this way, the RRC layer 203 is able to provide the NAS layer 202 with the latest number of ACDC categories in the serving network. The RRC layer 203 may provide the NAS layer 202 with the ACDC control information only when the ACDC control information has been updated, or when the broadcast information has been updated regardless of whether the ACDC control information has been updated.

Additionally or alternatively, if the UE 1 detects that ACDC is being applied in the serving network, the RRC layer 203 may provide the NAS layer 202 with either or both of: the information regarding the one or more ACDC categories broadcasted by the serving network; and the number of the broadcasted ACDC category(ies).

In response to receiving a request for data transmission (in other words, a session establishment request) 403 from the application layer 201, if the UE 1 is in idle mode (e.g., ECM-IDLE), the NAS layer 202 determines an application identifier of the application that has triggered the request. The application identifier may include an OS App ID or may be an OS App ID. In some implementations, a combination of an Operating System identifier (OS ID) and an OS App ID is used to identify a particular application. The OS App ID is an OS-specific application identifier.

Furthermore, the NAS layer 202 determines to which ACDC category the application that has triggered the request belongs, based on the ACDC configuration 410 (404). The ACDC configuration 410 is configured in the UE 1 by a home network operator of the UE 1 and indicates mapping between one or more applications installed in the UE 1 (or their application identifiers) and one or more ACDC categories. As described above, the ACDC configuration 410 may be configured in the USIM implemented in the UE 1 by the home network operator. The home network operator may configure the ACDC configuration 410 in the UE 1 via OMA-DM.

When the serving network (i.e., eNB 2) broadcasts fewer ACDC categories than the ACDC configuration 410 provisioned in the UE 1, it is possible that the serving network (eNB 2) broadcasts no barring information corresponding to the ACDC category (hereinafter referred to as a first ACDC category) to which the application triggering the session establishment request belongs. In other words, it is possible that the first ACDC category to which the application triggering the session establishment request belongs is an unmatched ACDC category. The term "unmatched ACDC category" as used herein refers to an ACDC category configured in the UE 1 but with no corresponding barring information broadcasted by the serving network (i.e., eNB 2).

In the present embodiment, if no barring information corresponding to the first ACDC category (i.e., the value of the first ACDC category) is broadcasted by the serving network (i.e., eNB 2), the NAS layer 202 selects, from the one or more ACDC categories broadcasted by the serving network, a particular ACDC category instead of the first ACDC category (405). In other words, the NAS layer 202 replaces the first ACDC category (i.e., the value of the first ACDC category) with a (substitute) particular ACDC category (i.e., the value of the particular ACDC category) (405). In other words, the NAS layer 202 considers that the application triggering the session establishment request belongs to the particular ACDC category broadcasted by serving network instead of to the first ACDC category (405).

In other words, if the serving network (i.e., eNB 2) broadcasts fewer ACDC categories than the ACDC configuration 410 provisioned in the UE 1, the NAS layer 202 performs replacement of the ACDC categories in order to associate each ACDC category contained in the ACDC configuration 410 of the UE 1 with any one of the one or more ACDC categories broadcasted by the serving network (i.e., eNB 2) (405).

In one example, when the value of the first ACDC category is greater than the maximum value of the one or more ACDC categories (i.e., the value of the lowest ACDC category) broadcasted by the serving network, the NAS layer 202 may replace the value of the first ACDC category with the value of a particular ACDC category. In other words, the NAS layer 202 may use the value of a (substitute) particular ACDC category instead of the value of the first ACDC category.

Alternatively, when the value of the ACDC category corresponding to the value of the first ACDC category (and the barring information for the first ACDC category) is not broadcasted by the serving network, the NAS layer 202 may replace the value of the first ACDC category with the value of a particular ACDC category. In other words, the NAS layer 202 may use the value of a (substitute) particular ACDC category instead of the value of the first ACDC category.

In some implementations, the particular ACDC category (i.e., substitute ACDC category) selected by the NAS layer 202 may be the lowest ACDC category among the one or more ACDC categories broadcasted by the serving network (i.e., eNB 2). Such replacement of the ACDC categories may be preferable because the replacement follows the handling of an unmatched ACDC category described in Non-Patent Literature 1.

However, in another implementation, the particular ACDC category (i.e., substitute ACDC category) selected by the NAS layer 202 need not be the lowest ACDC category in the serving network (i.e., eNB 2). For example, when the number of the ACDC categories broadcasted by the serving network (i.e., eNB 2) is smaller than the number of the ACDC categories within the ACDC configuration 410 provisioned in the UE 1, the NAS layer 202 may determine the particular ACDC category (i.e., substitute ACDC category), with which the first ACDC category should be replaced, in accordance with a mapping rule determined in advance. The mapping rule defines mapping between a plurality of ACDC categories broadcasted (or possibly broadcasted) by the serving network and one or more ACDC categories provisioned in the UE 1. The mapping rule may be provisioned in the UE 1 or may be sent to the UE 1 from the serving network (i.e., eNB 2).

The NAS layer 202 passes the particular ACDC category (i.e., substitute ACDC category) selected instead of the first ACDC category to the RRC layer 203 along with a NAS message (i.e., Service Request (SR)) for the session establishment (406).

Upon receiving the Service Request along with the (substitute) ACDC category from the NAS layer 202, the RRC layer 203 performs an ACDC check based on the barring information broadcasted from the serving network (i.e., eNB 2) and corresponding to the substitute ACDC category (407). Specifically, the RRC layer 203 controls whether to allow an access attempt triggered by the Service Request from the NAS layer 202, based on the barring information broadcasted by the serving network (i.e., eNB 2) and corresponding to the particular ACDC category (i.e., substitute ACDC category).

Figure 5:
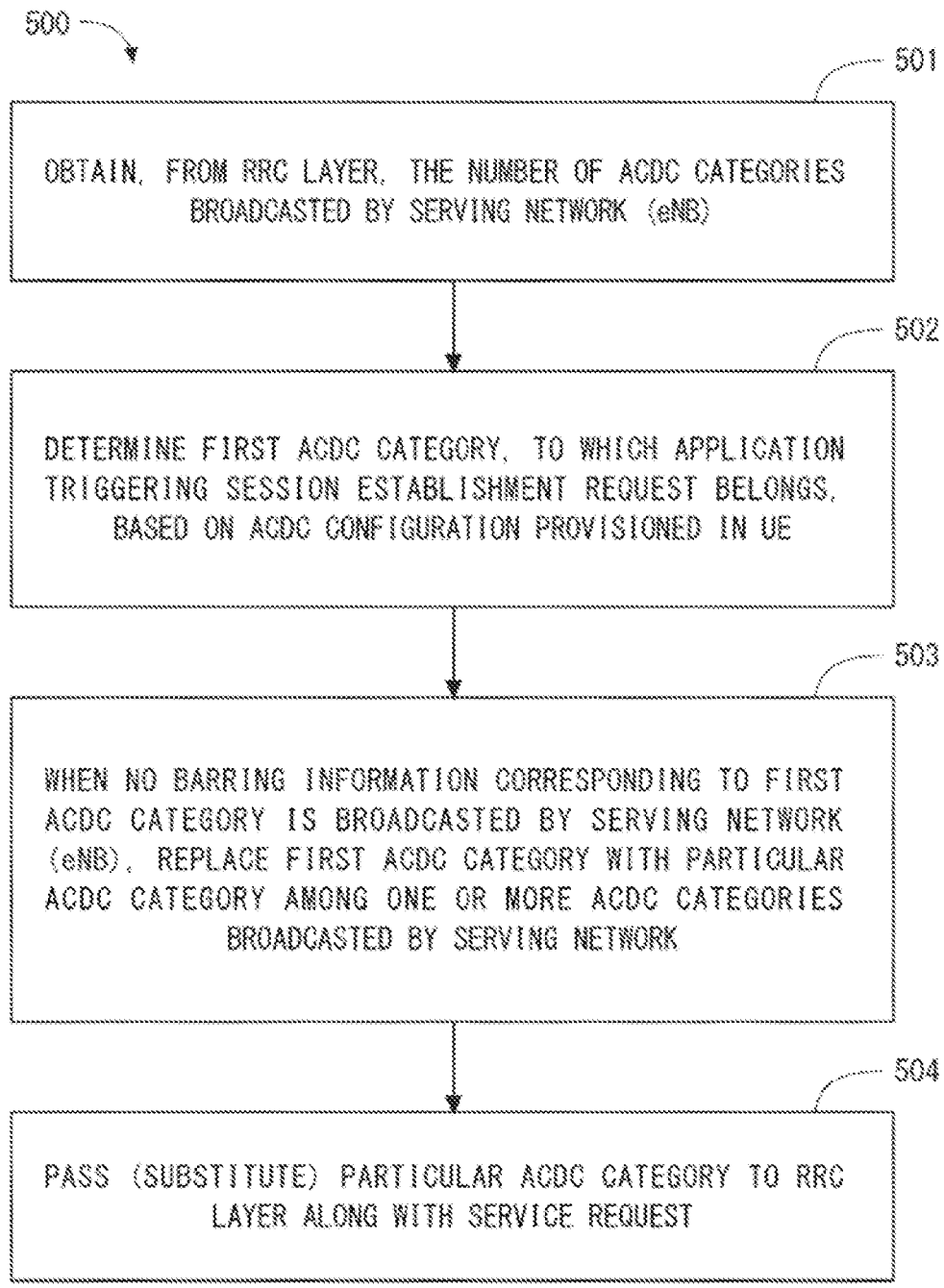
FIG. 5 is a flowchart showing an example of a NAS layer of the radio terminal according to the first embodiment.

FIG. 5 is a flowchart illustrating an example (process 500) of the operation regarding ACDC performed by the NAS layer 202 of the UE 1. In block 501, the NAS layer 202 obtains, from the RRC layer 203, the number of ACDC categories broadcasted by the serving network (i.e., eNB 2). In block 502, the NAS layer 202 determines the first ACDC category to which the application triggering the session establishment request belongs, based on the ACDC configuration 410 provisioned in the UE 1 by the home network operator.

In block 503, when no barring information corresponding to the first ACDC category is broadcasted by the serving network (i.e., eNB 2), the NAS layer 202 replaces the first ACDC category with a particular ACDC category among the one or more ACDC categories broadcasted by the serving network. In block 504, the NAS layer 202 passes the (substitute) particular ACDC category along with the Service Request to the RRC layer 203.

In order for the NAS layer 202 to pass the ACDC category along with the Service Request to the RRC layer 203, a new call type may be defined. The NAS layer 202 informs the RRC layer 203 of the call type when requesting the RRC layer 203 to establish a NAS signaling connection to transmit an initial NAS message (e.g., Service Request). Existing call type indicates "originating calls", "terminating calls", "emergency calls", or "originating signaling". In addition to the above, when an application triggering session establishment belongs to an ACDC category X, the new call type may be, for example, "ACDC Cat-X originating calls". By receiving the new call type, the RRC layer 203 is able to know the ACDC category to which the application triggering the access attempt (i.e., attempt for RRC connection establishment) belongs.

Alternatively, a new information element different from the call type may be defined to represent an ACDC category. The new information element may be, for example, "ACDC Category Indication", "Established ACDC Category", "Triggered ACDC category", "Selected ACDC Category", or "Assigned ACDC Category". In this case, the NAS layer 202 may pass, to the RRC layer 203, the new information element along with the initial NAS message (e.g., Service Request) and the call type (e.g., originating calls). By receiving the new information element, the RRC layer 203 is able to know the ACDC category to which the application triggering the access attempt (i.e., attempt for RRC connection establishment) belongs.

As can be understood from the foregoing description, in the example described with reference to FIG. 4 and FIG. 5, when barring information corresponding to the first ACDC category to which the application triggering the session establishment request belongs is not broadcasted by the serving network (i.e., eNB 2), the NAS layer 202 replaces the first ACDC category with a substitute ACDC category and sends (or passes) the substitute ACDC category to the RRC layer 203. The substitute ACDC category is one of the one or more ACDC categories broadcasted by the serving network. In other words, if the serving network (eNB 2) broadcasts fewer ACDC categories than the ACDC configuration 410 provisioned in the UE 1, the NAS layer 202 performs replacement of the ACDC categories in order to associate each ACDC category contained in the ACDC configuration 410 of the UE 1 with any one of the one or more ACDC categories broadcasted by the serving network (i.e., eNB 2). The RRC layer 203 then performs an ACDC check based on the barring information broadcasted by the serving network (i.e., eNB 2) and corresponding to the substitute ACDC category.

That is, according to the example described with reference to FIG. 4 and FIG. 5, the NAS layer 202 of the UE 1 is able to perform the replacement of the ACDC categories, and the RRC layer 203 of the UE 1 is able to perform the ACDC check.

In one example, the NAS layer 202 may release the information regarding the (substitute) particular ACDC category each time the UE 1 changes its serving cell. Alternatively, the NAS layer 202 may retain the information regarding the particular ACDC category even when the UE 1 has changed its serving cell. For example, the NAS layer 202 may retain the information regarding the particular ACDC category while the UE 1 has selected the same PLMN (or the same serving network) and while the ACDC function is activated in the serving cell(s) after changing its serving cell.

Second Embodiment

This embodiment provides a modification example of the ACDC operation in the UE 1 described in the first embodiment. Specifically, an example in which the RRC layer 203, instead of the NAS layer 202, performs the replacement of the ACDC categories will be described. The configuration example of the radio communication network according to the present embodiment is similar to that illustrated in FIG. 1, and the control plane protocol stack of the UE 1 is similar to that illustrated in FIG. 2.

Figure 6:
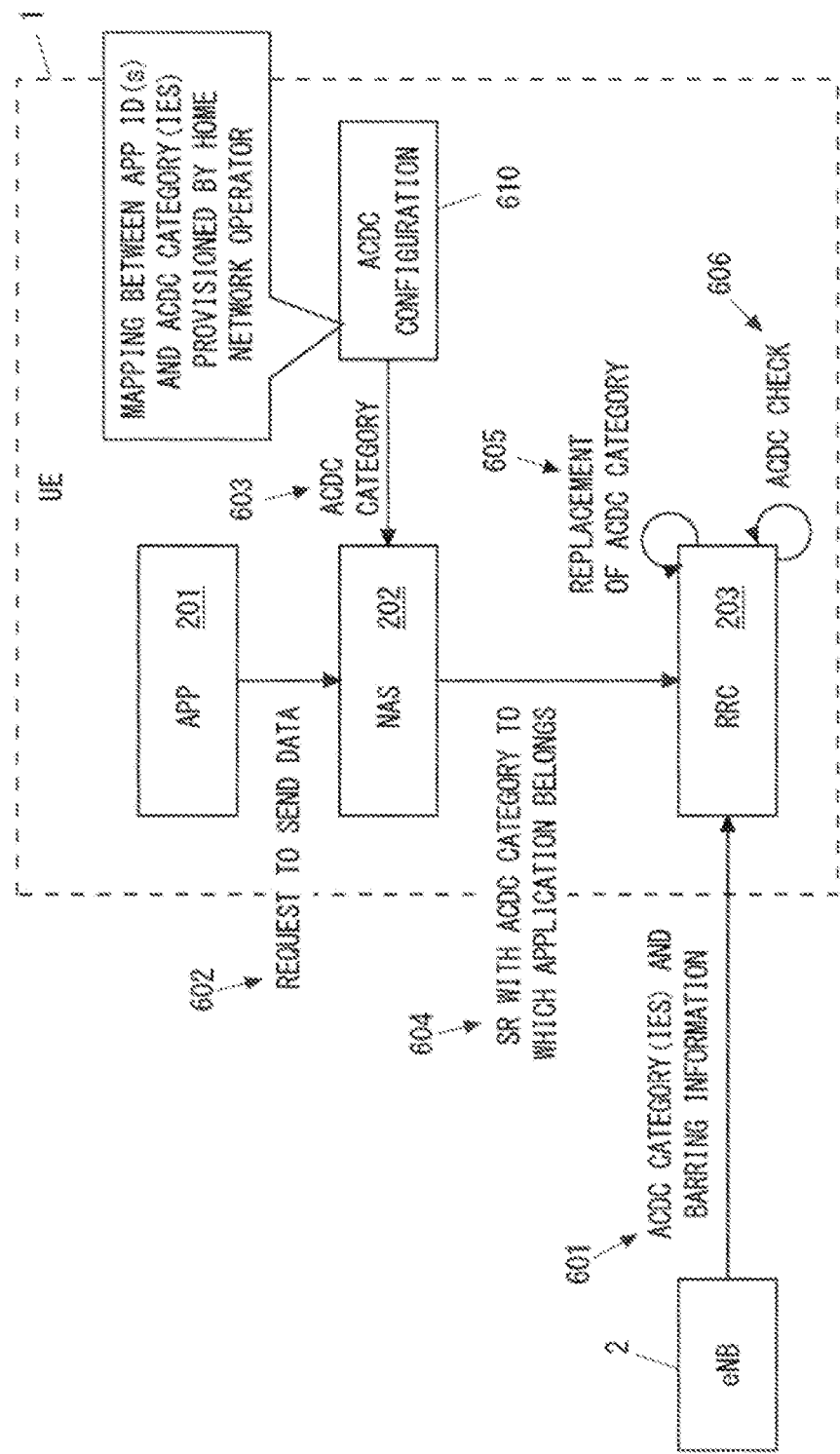
FIG. 6 is a diagram for describing an ACDC operation performed by a radio terminal according to a second embodiment.

FIG. 6 illustrates an example of the ACDC operation in the UE 1. The eNB 2 transmits ACDC control information to the UE 1 (601). The ACDC control information includes a plurality of ACDC categories and barring information per ACDC category. The eNB 2 may incorporate the ACDC control information into broadcast information (e.g., SIB information) broadcasted in the cell 21 to enable the UE 1 in idle mode (i.e., in ECM-IDLE and RRC_IDLE) to receive the ACDC control information.

In response to receiving a request for data transmission (in other words, a session establishment request) 602 from the application layer 201, if the UE 1 is in idle mode (ECM-IDLE), the NAS layer 202 determines an application identifier of the application that has triggered the request. The application identifier may include an OS App ID or may be an OS App ID. Furthermore, the NAS layer 202 determines to which ACDC category the application that has triggered the request belongs based on the ACDC configuration 610 (603). The ACDC configuration 610 is similar to the ACDC configuration 410 illustrated in FIG. 4. In other words, the ACDC configuration 610 indicates mapping between a plurality of applications (application identifiers) installed in the UE 1 (or their application identifiers) and a plurality of ACDC categories. The ACDC configuration 610 is provisioned in the UE 1, for example, via OMA-DM or USIM.

The NAS layer 202 passes, to the RRC layer 203, the ACDC category to which the application that triggers the session establishment request belongs (i.e., the ACDC category derived from the ACDC configuration 610) along with a NAS message for session establishment (i.e., Service Request (SR)) (604).

As described with reference to FIG. 4, when the serving network (i.e., eNB 2) broadcasts fewer ACDC categories than the ACDC configuration 410 provisioned in the UE 1, it is possible that the serving network (i.e., eNB 2) broadcasts no barring information corresponding to the ACDC category (hereinafter referred to as a first ACDC category) to which the application that triggers the session establishment request belongs. In other words, it is possible that the ACDC category to which the application that triggers the session establishment request belongs is an unmatched ACDC category. The term "unmatched ACDC category" as used herein refers to an ACDC category configured in the UE 1 but with no corresponding barring information broadcasted by the serving network (i.e., eNB 2).

In the present embodiment, if no barring information corresponding to the first ACDC category is broadcasted by the serving network (i.e., eNB 2), the RRC layer 203 selects, from the one or more ACDC categories broadcasted by the serving network, a particular ACDC category instead of the first ACDC category (605). In other words, the RRC layer 203 replaces the first ACDC category with a (substitute) particular ACDC category (605). In other words, the RRC layer 203 considers that the application that triggers the session establishment request belongs to a particular ACDC category broadcasted by serving network (605), instead of to the first ACDC category.

In other words, if the serving network (i.e., eNB 2) broadcasts fewer ACDC categories than the ACDC configuration 610 provisioned in the UE 1, the RRC layer 203 performs replacement of the ACDC categories in order to associate each ACDC category contained in the ACDC configuration 610 of the UE 1 with any one of the one or more ACDC categories broadcasted by the serving network (i.e., eNB 2) (605).

In one example, when the value of the first ACDC category is greater than the maximum value of the one or more ACDC categories (i.e., the value of the lowest ACDC category) broadcasted by the serving network, the RRC layer 203 may replace the value of the first ACDC category with the value of the (substitute) particular ACDC category. In other words, the RRC layer 203 may use the value of the (substitute) particular ACDC category instead of the value of the first ACDC category.

Alternatively, when the value of the ACDC category corresponding to the value of the first ACDC category (and the barring information for the first ACDC category) is not broadcasted by the serving network, the RRC layer 203 may replace the value of the first ACDC category with the value of the particular ACDC category. In other words, the RRC layer 203 may use the value of the (substitute) particular ACDC category instead of the value of the first ACDC category.

In some implementations, the particular ACDC category (i.e., substitute ACDC category) selected by the RRC layer 203 may be the lowest ACDC category among the one or more ACDC categories broadcasted by the serving network (i.e., eNB 2). Such replacement of ACDC categories may be preferable because the replacement follows the handling of an unmatched ACDC category described in Non-Patent Literature 1.

However, in another implementation, the particular ACDC category (i.e., substitute ACDC category) selected by the RRC layer 203 need not be the lowest ACDC category in the serving network (i.e., eNB 2). For example, when the number of ACDC categories broadcasted by the serving network (i.e., eNB 2) is smaller than the number of ACDC categories within the ACDC configuration 610 provisioned in the UE 1, the RRC layer 203 may determine the particular ACDC category (i.e., substitute ACDC category), with which the first ACDC category should be replaced, in accordance with a mapping rule determined in advance. The mapping rule defines mapping between a plurality of ACDC categories broadcasted (or possibly broadcasted) by the serving network and one or more ACDC categories provisioned in the UE 1. The mapping rule may be provisioned in the UE 1 or may be sent to the UE 1 from the serving network (i.e., eNB 2).

The RRC layer 203 performs an ACDC check based on the barring information broadcasted by the serving network (i.e., eNB 2) and corresponding to the substitute ACDC category (606). In other words, the RRC layer 203 controls whether to allow an access attempt triggered by the Service Request from the NAS layer 202, based on the barring information broadcasted by the serving network (i.e., eNB 2) and corresponding to the particular ACDC category (substitute ACDC category).

Figure 7:
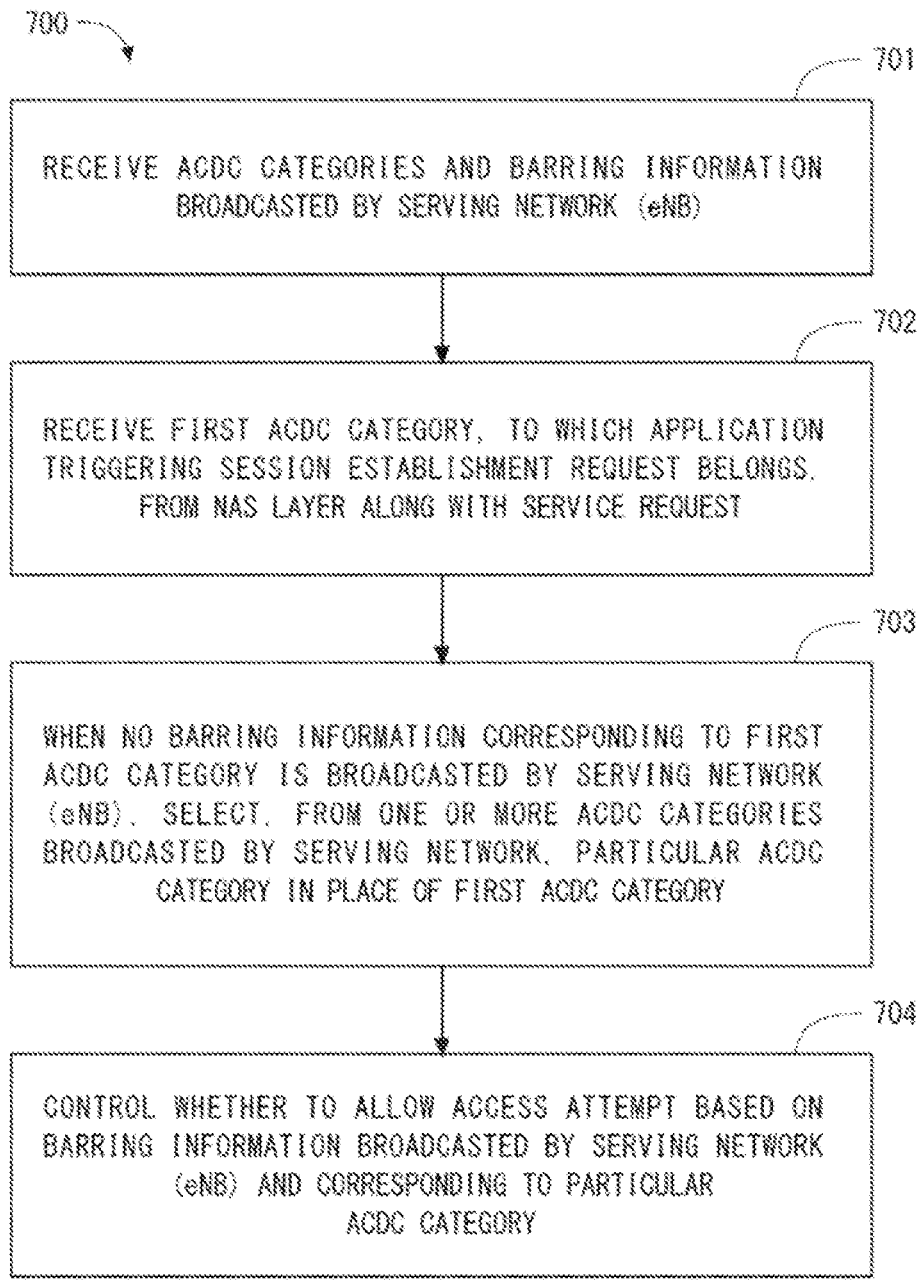
FIG. 7 is a flowchart showing an example of an RRC layer of the radio terminal according to the second embodiment.

FIG. 7 is a flowchart illustrating an example (process 700) of the operation regarding ACDC performed by the RRC layer 203 of the UE 1. In block 701, the RRC layer 203 receives one or more ACDC categories and barring information broadcasted by the serving network (eNB 2).

In block 702, the RRC layer 203 receives the first ACDC category, to which the application that triggers the session establishment request belongs, from the NAS layer 202 along with a Service Request. As described above, the first ACDC category is derived by the NAS layer 202 from the ACDC configuration 610 provisioned in the UE 1.

In block 703, when no barring information corresponding to the first ACDC category is broadcasted by the serving network (i.e., eNB 2), the RRC layer 203 selects, from the one or more ACDC categories broadcasted by the serving network, a particular ACDC category instead of the first ACDC category.

In block 704, the RRC layer 203 controls whether to allow the access attempt based on the barring information broadcasted by the serving network (i.e., eNB 2) and corresponding to the particular ACDC category.

As described in the first embodiment, in order for the NAS layer 202 to pass the ACDC category along with the Service Request to the RRC layer 203, a new call type may be defined. The NAS layer 202 informs the RRC layer 203 of the call type when requesting the RRC layer 203 to establish a NAS signaling connection to transmit an initial NAS message (e.g., Service Request). Existing call type indicates "originating calls", "terminating calls", "emergency calls", or "originating signaling". In addition to the above, when the application that triggers the session establishment belongs to an ACDC category X, the new call type may be, for example, "ACDC Cat-X originating calls".

By receiving the new call type, the RRC layer 203 is able to know the first ACDC category to which the application that triggers the access attempt (i.e., attempt for RRC connection establishment) belongs. If barring information corresponding to the first ACDC category specified by the new call type is not broadcasted by the serving network or if the RRC layer 203 cannot recognize the new call type (or if the new call type is an "unknown call type"), the RRC layer 203 may select a substitute ACDC category.

Alternatively, a new information element different from the call type may be defined to represent an ACDC category. The new information element may be, for example, "ACDC Category Indication", "Established ACDC Category", "Triggered ACDC category", "Selected ACDC Category", or "Assigned ACDC Category". In this case, the NAS layer 202 may pass, to the RRC layer 203, the new information element along with the initial NAS message (e.g., Service Request) and with the call type (e.g., originating calls). By receiving the new information element, the RRC layer 203 is able to know the first ACDC category to which the application that triggers the access attempt (i.e., attempt for RRC connection establishment) belongs. When no barring information corresponding to the first ACDC category specified by the new information element is broadcasted by the serving network or when the RRC layer 203 cannot recognize the first ACDC category specified by the new information element (or when the first ACDC category is an "unknown ACDC category"), the RRC layer 203 may select a substitute ACDC category.

As can be understood from the foregoing description, in the example described with reference to FIG. 6 and FIG. 7, when barring information corresponding to the first ACDC category to which the application that triggers the session establishment request belongs is not broadcasted by the serving network (i.e., eNB 2), the RRC layer 203 selects a substitute ACDC category instead of the first ACDC category and performs an ACDC check based on the barring information broadcasted by the serving network (i.e., eNB 2) and corresponding to the substitute ACDC category. In other words, if the serving network (i.e., eNB 2) broadcasts fewer ACDC categories than the ACDC configuration 610 provisioned in the UE 1, the RRC layer 203 performs replacement of the ACDC categories in order to associate each ACDC category contained in the ACDC configuration 610 of the UE 1 with any one of the one or more ACDC categories broadcasted by the serving network (i.e., eNB 2).

That is, according to the example described with reference to FIG. 6 and FIG. 7, the RRC layer 203 of the UE 1 is able to perform the replacement of the ACDC categories and the ACDC check.

Third Embodiment

This embodiment provides a modification example of the ACDC operation in the UE 1 described in the first and second embodiments. The configuration example of a radio communication network according to the present embodiment is similar to that illustrated in FIG. 1, and the control plane protocol stack of the UE 1 is similar to that illustrated in FIG. 2.

As described in the first and second embodiments, when the serving network (i.e., eNB 2) broadcasts fewer ACDC categories than the ACDC configuration 410 or 610 provisioned in the UE 1, the NAS layer 202 or the RRC layer 203 selects a substitute ACDC category. At this point, the NAS layer 202 or the RRC layer 203 may select the substitute ACDC category in accordance with a mapping rule sent from the serving network (i.e., eNB 2). The mapping rule defines mapping between a plurality of ACDC categories broadcasted (or possibly broadcasted) by the serving network and one or more ACDC categories provisioned in the UE 1.

Figure 8:
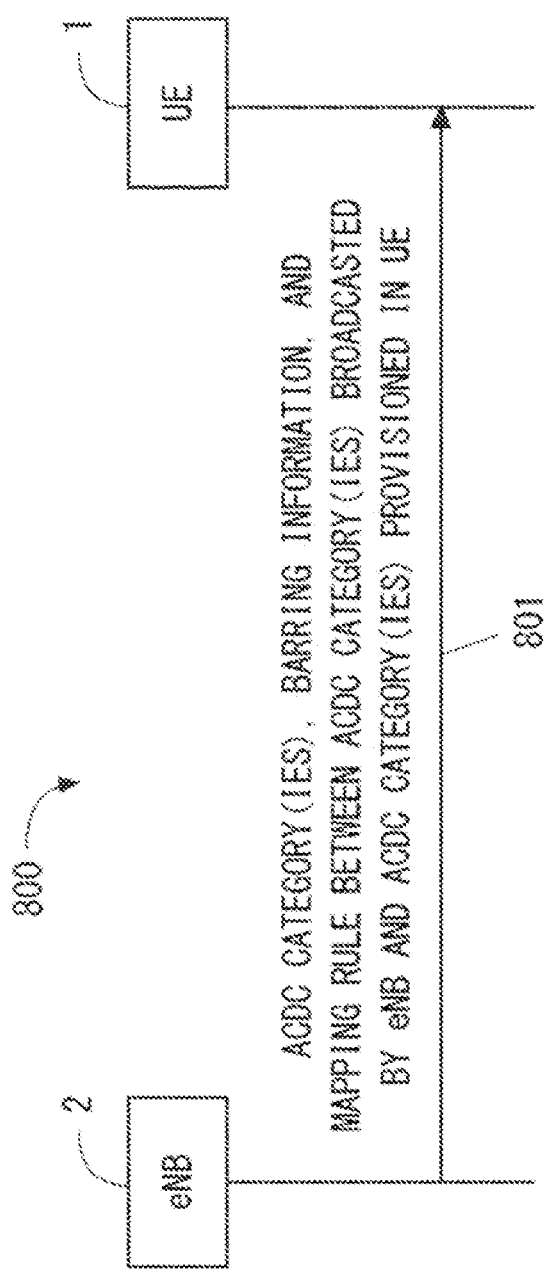
FIG. 8 is a sequence diagram showing an example of operations of a base station and a radio terminal according to a third embodiment.

FIG. 8 is a sequence diagram illustrating an example (process 800) of a procedure for sending the mapping rule from the eNB 2 to the UE 1. In step 801, the eNB 2 transmits, to the UE 1, a plurality of ACDC categories used in the cell 21, barring information per ACDC category, and the mapping rule between the ACDC categories broadcasted by the eNB 2 and the ACDC categories provisioned in the UE 1. The eNB 2 may transmits broadcast information (SIB information) containing the above information in the cell 21.

For example, a case in which the ACDC configuration (410 or 610) within the UE 1 defines five ACDC categories and the serving network (i.e., eNB 2) defines three ACDC categories will be considered. In this case, the mapping rule may associate the highest ACDC category within the ACDC configuration of the UE 1 to the highest ACDC category of the serving network, associate the second and third highest ACDC categories within the ACDC configuration of the UE 1 to the second highest ACDC category of the serving network, and associate the fourth and fifth highest ACDC categories within the ACDC configuration of the UE 1 to the third highest (i.e., the lowest) ACDC category of the serving network.

The eNB 2 may provide a plurality of mapping rules to the UE 1 in order to associate a specific ACDC category number (e.g., 3) used in the serving network (eNB 2) with a plurality of ACDC category numbers (e.g., 4, 5, 6, . . . ) provisioned in the UE 1.

In the present embodiment, the serving network (i.e., eNB 2) is able to explicitly indicate, to the UE 1, the mapping between the ACDC category numbers used in the serving network (eNB 2) and the ACDC category numbers provisioned in the UE 1

In one example, the AS layer 208 (RRC layer 203) may release the information regarding the (substitute) particular ACDC category each time the UE 1 changes its serving cell. Alternatively, the AS layer 208 (RRC layer 203) may retain the information regarding the particular ACDC category even when the UE 1 has changed its serving cell. For example, the AS layer 208 (RRC layer 203) may retain the information regarding the particular ACDC category while the UE 1 has selected the same PLMN (or the same serving network) and while the ACDC function is activated in the changed serving cell(s).

Fourth Embodiment

This embodiments described above assume a case in which the UE 1 in idle mode (e.g., RRC_IDLE) is subject to ACDC. In the present embodiment, ACDC is applied to the UE 1 in connected mode (e.g., RRC_CONNECTED). In other words, in this embodiment, it is assumed that ACDC is used in the UE 1 when the UE 1 already in connected mode is to start a new application (or service). In this case, it is conceivable that ACDC implements control for a service request (i.e., restriction on a service request) on an RRC_CONNECTED terminal, instead of access control (i.e., access restriction) on an RRC_IDLE terminal. Here, the control (restriction) on the Service Request in the UE 1 in RRC_CONNECTED may be a control (prevention) of transmission of a Scheduling Request to request an uplink resource to be assigned by the eNB 2 in order to transmit a Service Request from the UE 1 to start the application (or service). Alternatively, when the UE 1 in RRC_CONNECTED is not configured with control resources (Physical Uplink Control Channel (PUCCH)) for transmitting the Scheduling Request (i.e., uplink recourse request) or when the uplink synchronization state of the UE 1 is "non-synchronised" or "out-of-sync," the control (restriction) on the Service Request in the UE 1 in RRC_CONNECTED may be a control (prevention) of initiation of a random access procedure (i.e., transmission of a random access preamble).

The UE 1 may perform, for example, a procedure as follows. The UE 1 establishes a radio connection (RRC Connection) with the eNB 2 in the cell 21 of the eNB 2 and enters the RRC_CONNECTED state. In one case, the UE 1 may enter the RRC_CONNECTED state after performing ACDC (i.e., after performing the access control of ACDC). Alternatively, in another case, ACDC may not be activated (i.e., the eNB 2 has not broadcasted the ACDC control information) in the serving cell (with respect to the serving network of the PLMN selected by the NAS layer of the UE 1) at the point when the UE 1 enters the RRC_CONNECTED state, and thus the UE 1 may have entered the RRC_CONNECTED state without performing ACDC.

Thereafter, when a trigger that starts a new application (or service) in the UE 1 in the RRC_CONNECTED state occurs, the UE 1 checks whether ACDC has been activated in the serving cell (i.e., whether the eNB 2 has broadcasted the ACDC control information). When the ACDC has been activated, the NAS layer or the RRC layer of the UE 1 performs the matching between the ACDC configuration provisioned in the UE 1 and the ACDC control information broadcasted in the serving cell. Specifically, the NAS layer or the RRC layer of the UE 1 checks whether the barring information corresponding to the first ACDC category that corresponds to the application (or service) is broadcasted. When no barring information corresponding to the first ACDC category is broadcasted, the UE 1 selects a particular ACDC category as a substitute for the first ACDC category. The matching between the ACDC configuration and the ACDC control information can be implemented using a procedure similar to that described in the first embodiment or the second embodiment, and thus detailed description thereof will be omitted.

After that, the RRC layer of the UE 1 performs a Service Request (e.g., instruction to the MAC layer to transmit a Scheduling Request or to start a random access procedure) based on the barring information corresponding to the first ACDC category or to the replaced particular ACDC category. For example, when the barring information does not allow the application (service) to send the Service Request, the UE 1 does not perform the Service Request in the serving cell for a predetermined period or until ACDC is deactivated. Alternatively, when the Service Request is allowed at a predetermined probability, the UE 1 may perform the Service Request in accordance with this probability.

In this way, the access control (in this case, the Service Request restriction) can be performed even on the UE 1 already in the RRC_CONNECTED state, and the overload of the network can be prevented or mitigated. ACDC on the RRC_CONNECTED terminal may be performed on a per-terminal basis or on a per group-of-terminals basis. In addition, the eNB 2 may transmit at least a portion of the ACDC control information to the UE 1 using a terminal dedicated message (e.g., RRC Connection Reconfiguration message). In this case, the UE 1 may preferentially use the configuration specified by the terminal dedicated message over the configuration specified by the broadcasted ACDC control information.

Figure 9:
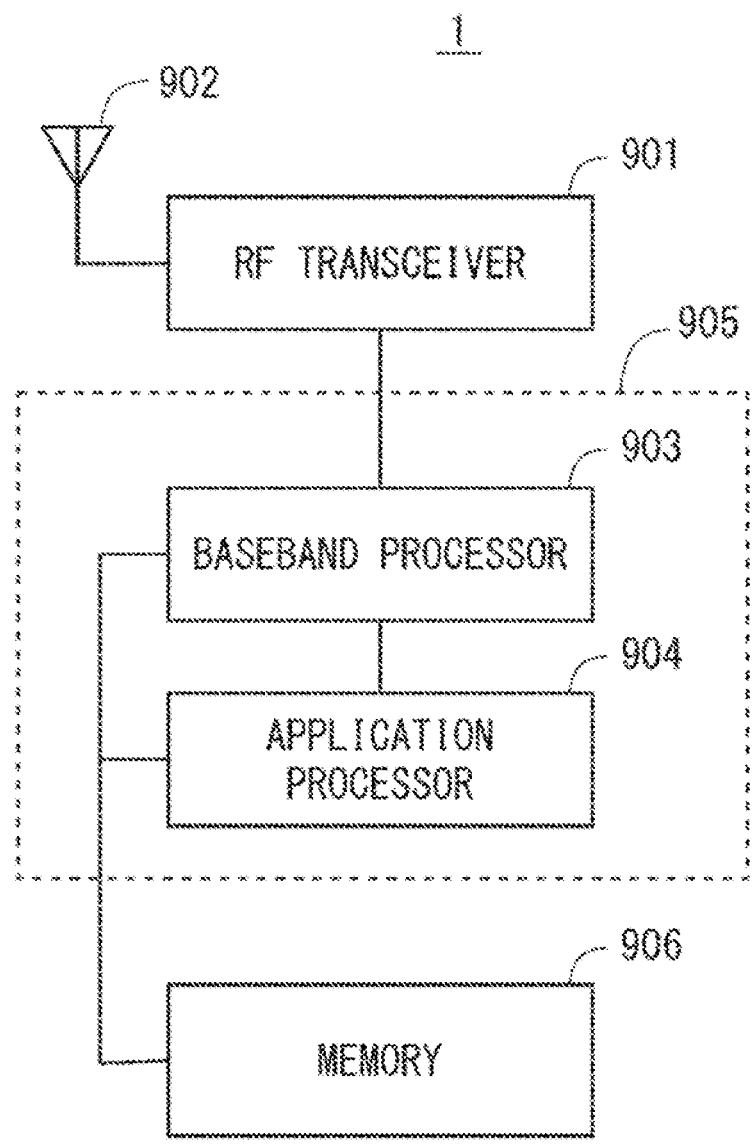
FIG. 9 is a block diagram showing a configuration example of a radio terminal according to some embodiments.

Lastly, a configuration example of the UE 1 according to the above-described embodiments will be described. FIG. 9 is a block diagram showing a configuration example of the UE 1 according to the above embodiments. A Radio Frequency (RF) transceiver 901 performs analog RF signal processing to communicate with the eNB 2. The analog RF signal processing performed by the RF transceiver 901 includes frequency up-conversion, frequency down-conversion, and amplification. The RF transceiver 901 is coupled to an antenna 902 and a baseband processor 903. That is, the RF transceiver 901 receives modulation symbol data (or OFDM symbol data) from the baseband processor 903, generates a transmission RF signal, and supplies the transmission RF signal to the antenna 902. Moreover, the RF transceiver 901 generates a baseband reception signal based on a reception RF signal received by the antenna 902, and supplies the baseband reception signal to the baseband processor 903.

The baseband processor 903 performs digital baseband signal processing (i.e., data plane processing) and control plane processing for radio communication. The digital baseband signal processing includes (a) data compression/decompression, (b) data segmentation/concatenation, (c) generation/decomposition of a transmission format (transmission frame), (d) transmission channel coding/decoding, (e) modulation (symbol mapping)/demodulation, (f) generation of OFDM symbol data (baseband OFDM signal) by Inverse Fast Fourier Transform (IFFT), and the like. On the other hand, the control plane processing includes communication management in the layer 1 (e.g., transmission power control), layer 2 (e.g., radio resource management and hybrid automatic repeat request (HARQ) processing), and layer 3 (e.g., signaling regarding attach, mobility, and call management).

For example, in the case of LTE and LTE-Advanced, the digital baseband signal processing performed by the baseband processor 903 may include signal processing in the Packet Data Convergence Protocol (PDCP) layer, Radio Link Control (RLC) layer, MAC layer, and PHY layer. Further, the control plane processing by the baseband processor 903 may include the processing of the Non-Access Stratum (NAS) protocol, RRC protocol, and MAC CE.

The baseband processor 903 may include a modem processor (e.g., Digital Signal Processor (DSP)) that performs the digital baseband signal processing and a protocol stack processor (e.g., Central Processing Unit (CPU) or Micro Processing Unit (MPU)) that performs the control plane processing. In this case, the protocol stack processor that performs the control plane processing may be integrated with an application processor 904 described in the following.

The application processor 904 is also referred to as a CPU, an MPU, a microprocessor, or a processor core. The application processor 904 may include a plurality of processors (a plurality of processor cores). The application processor 904 loads a system software program (Operating System (OS)) and various application programs (e.g., a call application, a WEB browser, a mailer, a camera operation application, a music playback application) from a memory 906 or from another memory (not shown) and executes these programs, thereby providing various functions of the UE 1.

In some implementations, as indicated by the dashed line (905) in FIG. 9, the baseband processor 903 and the application processor 904 may be integrated on a single chip. In other words, the baseband processor 903 and the application processor 904 may be implemented in one System on Chip (SoC) device 905. A SoC device is sometimes referred to as a system Large Scale Integration (LSI) or a chipset.

The memory 906 is a volatile memory or a non-volatile memory or a combination thereof. The memory 906 may include a plurality of physically independent memory devices. The volatile memory is, for example, Static Random Access Memory (SRAM), Dynamic RAM (DRAM) or a combination thereof. The non-volatile memory may be a Mask Read Only Memory (MROM), an Electrically Erasable Programmable ROM (EEPROM), a flash memory, a hard disk drive, or any combination thereof. The memory 906 may include an external memory device accessible from the baseband processor 903, the application processor 904, and the SoC 905. The memory 906 may include an internal memory device integrated within the baseband processor 903, the application processor 904, or the SoC 905. The memory 906 may further include a memory in a Universal Integrated Circuit Card (UICC).

The memory 906 may store a software module(s) (computer program(s)) including instructions and data for processing by the UE 1 described in the above embodiments. In some implementations, the baseband processor 903 or the application processor 904 may be configured to load the software module(s) from the memory 906 and execute the loaded software module(s), thereby performing the processing of the remote UE 1 described in the above embodiments.

Figure 10:
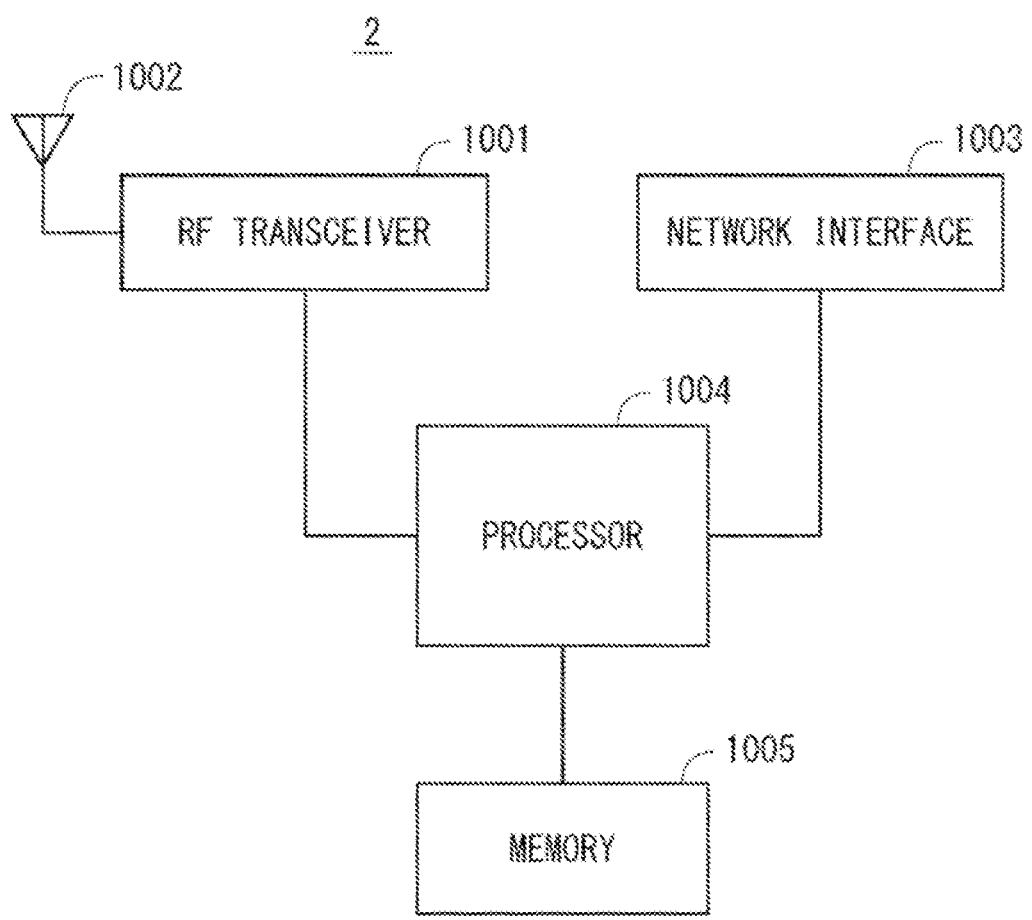
FIG. 10 is a block diagram showing a configuration example of a base station according to some embodiments.

FIG. 10 is a block diagram showing a configuration example of the base station (eNB) 2. Referring to FIG. 10, the base station 2 includes an RF transceiver 1001, a network interface 1003, a processor 1004, and a memory 1005. The RF transceiver 1001 performs analog RF signal processing to communicate with the radio terminal 1. The RF transceiver 1001 may include a plurality of transceivers. The RF transceiver 1001 is coupled to an antenna 1002 and a processor 1004. The RF transceiver 1001 receives modulation symbol data (or OFDM symbol data) from the processor 1004, generates a transmission RF signal, and supplies the transmission RF signal to the antenna 1002. Moreover, the RF transceiver 1001 generates a baseband reception signal based on a reception RF signal received by the antenna 1002, and supplies the baseband reception signal to the processor 1004.

The network interface 1003 is used to communicate with network nodes (e.g., Mobility Management Entity (MME) and Serving Gateway (S-GW)). The network interface 1003 may include, for example, a network interface card (NIC) conforming to the IEEE 802.3 series.

The processor 1004 performs digital baseband signal processing (i.e., data plane processing) and control plane processing for radio communication. For example, in the case of LTE and LTE-Advanced, the digital baseband signal processing performed by the processor 1004 may include signal processing of the PDCP layer, RLC layer, MAC layer, and PHY layer. Further, the control plane processing performed by the processor 104 may include processing of the S1 protocol, RRC protocol, and MAC CE.

The processor 1004 may include a plurality of processors. The processor 1004 may include, for example, a modem processor (e.g., DSP) that performs the digital baseband signal processing and a protocol stack processor (e.g., CPU or MPU) that performs the control plane processing.

The memory 1205 is composed of a combination of a volatile memory and a non-volatile memory. The memory 1205 may include a plurality of physically independent memory devices. The volatile memory is, for example, SRAM, DRAM or a combination thereof. The non-volatile memory may be a MROM, an EEPROM, a flash memory, a hard disk drive, or any combination thereof. The memory 1005 may include a storage disposed separately from the processor 1004. In this case, the processor 1004 may access the memory 1005 via the network interface 1003 or a not illustrated I/O interface.

The memory 1005 may store a software module(s) (computer program(s)) including instructions and data for processing by the base station 2 described in the above embodiments. In some implementations, the processor 1004 may be configured to load the software module(s) from the memory 1005 and execute the loaded software module(s), thereby performing the processing of the base station 2 described in the above embodiments.

As described with reference to FIGS. 9 and 10, each of the processors included in the UE 1 and eNB 2 according to the above-described embodiments executes one or more programs including instructions for causing a computer to perform the algorithm described with reference to the drawings. These programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), Compact Disc Read Only Memory (CD-ROM), CD-R, CD-R/W, semiconductor memories (such as Mask ROM, Programmable ROM (PROM), Erasable PROM (EPROM), flash ROM, Random Access Memory (RAM)). These programs can be stored and provided to a computer using any type of transitory computer readable media. Examples of transitory computer readable media include electric signals, optical signals, and electromagnetic waves. Transitory computer readable media can provide programs to a computer via a wired communication line (e.g. electric wires, and optical fibers) or a wireless communication line.

Other Embodiments

Each of the above embodiments may be used individually, or two or more of the embodiments may be appropriately combined with one another.

The UE 1 (NAS layer 202 or AS layer 208) capable of retaining the information regarding the particular ACDC category even the serving cell has been changed as described as an example in the foregoing embodiments may, when the serving network (eNB 2) is changed to another network (second network) having a different PLMN Identity, discard, release, or modify the particular ACDC category selected instead of, replaced with, or regarded as belonging to the first ACDC category for the serving network (first network) that has not been changed.

Here, the case in which the UE 1 has changed the serving network to the second network may be a case in which the UE 1 has made a handover (Inter-PLMN HO) from the first network to the second network or may be a case in which the UE 1 has changed the serving network from the first network to the second network by making a network selection (PLMN selection) in idle mode (e.g., RRC_IDLE).

Alternatively, in response to receiving the information regarding the one or more ACDC categories broadcasted from the second network, the UE 1 may discard, release, or modify the particular ACDC category selected instead of, replaced with, or regarded as belonging to the first ACDC category for the first network.

For example, in the case of the first embodiment, in response to obtaining (receiving), from the RRC layer 203, either or both of the information regarding the one or more ACDC categories broadcasted by the second network and the number of broadcasted ACDC category(ies) (203), the NAS layer 202 may discard, release, or modify the previous configuration (i.e., substitute particular ACDC category) within the NAS layer 202, but this is not a limiting example.

In the case of the second embodiment, in response to receiving the ACDC control information broadcasted by the second network (501), the RRC layer 203 may discard, release, or modify the previous configuration (i.e., substitute particular ACDC category) within the RRC layer 203, but this is not a limiting example.

According to the above, ACDC can be performed appropriately even when the UE 1 capable of retaining the information regarding the particular ACDC category even when the serving cell has been changed changes the serving network from the first network of one PLMN to the second network of another PLMN. For example, a case in which the ACDC category provisioned in advance in the UE 1 is 4, the ACDC categories provided by the first network are 1 to 3, and the ACDC categories provided by the second network are 1 to 4 will be considered. When the UE 1 moves to the second network after replacing the first ACDC category=4 with the particular ACDC category=3 for the first network, the UE 1 can discard (release) the configuration of the substitute particular ACDC category for the first network, and thus the UE 1 can appropriately perform ACDC in the second network.

In the embodiments described above, the eNB 2 may share information regarding ACDC performed in its own cell(s) (e.g., ACDC control information, or information about whether ACDC is being performed or not) with neighbour eNBs. In addition, the eNB 2 may transmit, in one of its cells, information regarding ACDC performed in adjacent cells (e.g., other cells of the eNB 2, or cells of other eNBs). The UE 1 may perform cell reselection based on the information regarding ACDC performed in the adjacent cell(s).

The embodiments described above are not limited to LTE, LTE-Advanced, and improvements thereof and may also be applied to application-specific access barring (or congestion control) in other radio communication networks and systems.

Further, the above-described embodiments are merely examples of applications of the technical ideas obtained by the inventor. The technical ideas are not limited to the above-described embodiments, and various changes and modifications may be made thereto.

The present application is based upon and claims the benefit of priority from Japanese Patent Application No. 2015-148790, filed on Jul. 28, 2015, the entire contents of which are hereby incorporated by reference.

REFERENCE SIGNS LIST

1 RADIO TERMINAL (UE)
2 BASE STATION (eNB)
901 RADIO FREQUENCY (RF) TRANSCEIVER
903 BASEBAND PROCESSOR
904 APPLICATION PROCESSOR
906 MEMORY
1001 RF TRANSCEIVER
1004 PROCESSOR
1005 MEMORY

The invention claimed is:

1. A radio terminal, comprising:
a radio transceiver; and
at least one processor coupled to the radio transceiver and configured to operate as a non-access stratum (NAS) layer providing mobility management and session management and as an access stratum (AS) layer providing radio resource control, wherein
the radio transceiver is adapted to receive from a base station, System Information Block (SIB) comprising control information of access barring category specific to application per Public Land Mobile Network (PLMN), the control information comprising at least one access barring category and barring information per access barring category,
the NAS layer is adapted to:
determine, based on access barring configuration information, an access barring category to which an application that triggers a session establishment belongs; and
pass the determined access barring category to the AS layer,
the AS layer is adapted to:
select a lowest access barring category in the control information if the determined access barring category is not presented in the control information; and
control whether to allow an access attempt based on barring information corresponding to the lowest access barring category.

2. The radio terminal according to claim 1, wherein
the NAS layer is adapted to send, to the AS layer, a call type indicating the determined access barring category in order to pass the determined access barring category to the AS layer, and
the AS layer is adapted to select the lowest access barring category instead of the determined access barring category, when the determined access barring category specified by the call type is not presented in the control information.

3. The radio terminal according to claim 1, wherein the access barring configuration information is provisioned in the radio terminal.

4. The radio terminal according to claim 1, wherein
the AS layer is adapted to determine the lowest access barring category to be selected instead of the determined access barring category in accordance with a mapping rule broadcasted by the base station, and
the mapping rule defines mapping between the at least one access barring category broadcasted by the base station and one or more access barring categories provisioned in the radio terminal.

5. A method in a radio terminal, the method comprising:
receiving, by a transceiver, from a base station, System Information Block (SIB) comprising control information of access barring category specific to application per Public Land Mobile Network (PLMN), the control information comprising at least one access barring category and barring information per access barring category;
determining, by a non-access stratum (NAS) layer, based on access barring configuration information, an access barring category to which an application that triggers a session establishment belongs;
passing the determined access barring category from the NAS layer to an access stratum (AS) layer;

selecting by the AS layer a lowest access barring category in the control information if the determined access barring category is not presented in the control information; and controlling, by the AS layer, whether to allow an access attempt triggered by the NAS layer based on barring information corresponding to the lowest access barring category.

6. The method according to claim 5, wherein the passing includes sending, to the AS layer, a call type indicating the determined access barring category, and the selecting includes selecting, by the AS layer, the lowest access barring category instead of the determined access barring category, when the determined access barring category specified by the call type is not presented in the control information.

7. The method according to claim 5, wherein the selecting includes determining, by the AS layer, the lowest access barring category to be selected instead of the determined access barring category in accordance with a mapping rule broadcasted by the base station, and the mapping rule defines mapping between the at least one access barring category broadcasted by the base station and one or more access barring categories provisioned in the radio terminal.

8. A base station comprising:

a radio transceiver configured to communicate with a radio terminal located within a cell; and at least one processor coupled to the radio transceiver and configured to broadcast, in the cell, System Information Block (SIB) comprising control information of access barring category specific to application per Public Land Mobile Network (PLMN), the control information comprising at least one access barring category and barring information per access barring category, wherein the control information is used by an access stratum (AS) layer of the radio terminal to select a lowest access barring category in the control information if an access barring category determined by the radio terminal is not presented in the control information.

9. The base station according to claim 8, wherein the SIB further comprises a mapping rule that defines mapping between the at least one access barring category broadcasted by the base station and one or more access barring categories provisioned in the radio terminal.

10. A method in a base station, the method comprising:

a radio transceiver configured to communicate with a radio terminal located within a cell; and at least one processor coupled to the radio transceiver and configured to broadcasting, in a cell, System Information Block (SIB) comprising control information of access barring category specific to application per Public Land Mobile Network (PLMN), the control information comprising at least one access barring category and barring information per access barring category, wherein the control information is used by an access stratum (AS) layer of a radio terminal to select a lowest access barring category in the control information if an access barring category determined by the radio terminal is not presented in the control information.

11. The method according to claim 10, wherein the SIB further comprises a mapping rule that defines mapping between the at least one access barring category broadcasted by the base station and one or more access barring categories provisioned in the radio terminal.

* * * * *